| United States Patent [19] | [11] Patent Number: 4,657,984 |
| McEntire et al. | [45] Date of Patent: Apr. 14, 1987 |

[54] PROCESS FOR FORMATION OF DIALKYLAMINOMETHYLATED INTERNAL OLEFIN POLYMERS

[75] Inventors: Edward E. McEntire, Kennett Square, Pa.; John F. Knifton, Austin, Tex.

[73] Assignee: Texaco Inc., White Plains, N.Y.

[21] Appl. No.: 787,861

[22] Filed: Oct. 16, 1985

[51] Int. Cl.$^4$ .................................................. C08F 8/40
[52] U.S. Cl. ................................. 525/340; 525/329.3; 525/331.3; 525/331.7; 525/332.8; 525/332.9; 525/333.1; 525/333.2
[58] Field of Search ........................................... 525/340

[56] References Cited

U.S. PATENT DOCUMENTS 3,513,200  5/1970  Biale ...................................... 260/583
4,503,217  3/1985  Alexander et al. .................. 525/379
4,526,936  7/1985  Jachimowiez et al. ............. 525/379

*Primary Examiner*—Joseph L. Schofer
*Assistant Examiner*—Bernard Lipman
*Attorney, Agent, or Firm*—Jack H. Park; Kenneth R. Priem; Cynthia L. Kendrick

[57] ABSTRACT

An aminomethylation reaction is disclosed wherein polymeric polyamines are produced. Polymeric polyolefins such as polybutadiene, secondary amines, and synthesis gas are reacted in the presence of a catalyst system comprising a ruthenium-containing compound, a rhodium-containing compound, a sterically hindered phosphine and a solvent. Preferred polybutadiene feedstocks are those with a predominance of internal rather than pendant vinylic olefin groups and particularly those polymers containing both the 1,2-polybutadiene and 1,4-polybutadiene units.

23 Claims, No Drawings

PROCESS FOR FORMATION OF DIALKYLAMINOMETHYLATED INTERNAL OLEFIN POLYMERS

FIELD OF THE INVENTION

This invention relates to a dialkylaminomethylation process and more particularly this invention relates to the selective preparation of dialkylaminomethylated polymers from polymers with internal olefins, a secondary amine and synthesis gas in the presence of a catalyst system comprising a ruthenium-containing compound, a rhodium-containing compound, a sterically hindered phosphine and a solvent, heating the mixture to a temperature of at least 100° C. and a pressure of at least 500 psi until there is substantial formation of the desired dialkylaminomethylated polymer and separating said dialkylaminomethylated product. This invention allows the use of low cost polybutadiene to produce high amine content polymers which may be useful as down hole corrosion inhibitors and is a significant contribution in the area of syngas technology.

BACKGROUND OF THE INVENTION

The principle of obtaining amines starting from an olefin, hydrogen, carbon monoxide and a primary or secondary amine is known. Various techniques embodying this principle have been described using catalysts of various kinds.

In a paper by Iqbal published in Helvetica Chemica Acta, Volume 54, pages 1440 to 1445 (1971), as well as in U.S. Pat. No. 3,947,458 (1976), the catalytic aminomethylation of olefins is described employing a rhodium oxide catalyst, an iron carbonyl catalyst and a mixed rhodium oxide/iron carbonyl catalyst.

U.S. Pat. No. 4,096,150 (1978) discloses a process for the manufacture of tertiary amines wherein an olefin, hydrogen, CO and secondary amine are reacted in the presence of a coordination complex catalyst of a Group VIII metal and a ligand, the donor atom of which is oxygen, nitrogen or sulfur.

Amines can be prepared from a dehydrogenated paraffin feedstock reacted with a nitrogen-containing compound, carbon monoxide and hydrogen in the presence of a rhodium or ruthenium-containing compound. See U.S. Pat. No. 4,179,469.

Yanagi et al. and Imai teach a process for preparing tertiary amines by reacting a long-chain olefin with carbon monoxide, hydrogen and a primary or secondary amine in the presence of a catalyst comprising rhodium and/or ruthenium and Yanagi teaches using a specifically outlined solvent which allows for phase separation. See U.S. Pat. Nos. 4,448,996 and 4,250,115.

In U.S. Pat. No. 4,207,260 (1980) to Imai, tertiary amines are prepared by reacting an aldehyde, hydrogen and a nitrogen-containing compound in the presence of rhodium- or ruthenium-containing catalyst at temperatures in the range of 50°-350° F. and a pressure in the range of 10 to 300 atm.

Another U.S. patent to Imai (U.S. Pat. No. 4,220,764 1980) teaches preparation of tertiary amines by a similar process except the catalyst comprises a rhodium chloride, rather than a rhodium carbonyl.

Van Leeuwen et al. report in an article in the J. Organometallic Chem. 258 (1983) 343-350, that phosphite ligands can be used to stabilize unsaturated rhodium species in order to hydroformylate otherwise unreactive olefins under mild conditions. No ruthenium carbonyl is employed in this process.

In *J. Org. Chem.*, 47, 445 (1982), Jachimowicz, et al. discuss the various approaches which have been used to attempt to devise a one-step, efficient and general conversion of olefins to amines. Among the catalysts used in processes devised by various people have been iron pentacarbonyl, rhodium oxide, ruthenium/iron carbonyl and iridium catalysts. The discussion in this article examines the properties of various aminomethylation catalysts.

In U.S. Pat. No. 4,297,481, Jachimowicz discloses a process for forming a polymeric polyamine/amide wherein said amino/amido nitrogens are positioned in the polymer backbone by contacting a monomeric nitrogen compound which has at least two labile hydrogens bonded to the nitrogen atoms therein, a monomeric hydrocarbon compound containing at least two olefinic groups therein, carbon monoxide and water in the presence of a catalytic amount of a rhodium-containing compound. This invention describes the use of ammonia or primary amines. The preparation of polymers with pendant amine and amide groups is described in U.S. Pat. No. 4,312,965. These polymers are prepared from polymeric polyolefins, carbon monoxide, and monomeric nitrogen compounds as described previously. Again, rhodium or a rhodium-containing compound serves as the catalyst.

Recently issued U.S. Pat. No. 4,503,217 teaches a process for preparing polymeric polyamines from polybutadiene, ammonia and primary or secondary amines in the presence of a catalyst system comprising a ruthenium-containing catalyst and a dimethyl formamide solvent which provides a two-phase liquid product, allowing for easy separation of the product polyamine.

Applicant's pending U.S. application Ser. No. 06/550,347 teaches a process for preparing secondary and tertiary aralkyl amines from aromatic vinylic olefins synthesis gas and a nitrogen-containing compound in the presence of a catalyst system comprising a ruthenium-containing compound, preferably in the presence of an amide solvent.

In the processes discussed above, the selective production of a dialkylaminomethylated internal olefin polymer is not contemplated.

A review of prior art indicates that others have prepared similar materials such as polymeric polyamines. Specifically, poly(butadienes) having high vinyl content that comprise a high concentration of the 1,2-polybutadiene building block have been reacted with synthesis gas and secondary dialkylamines to provide dialkylaminomethylated polymers with a high degree of functionality. Others have formed similar materials but have been unable to functionalize the internal olefinic groups prevalent in lower cost polybutadienes that comprise in the main the 1,4-polybutadiene building block. A good method is not available for causing a reaction to occur in the internal olefin groups prevalent in lower cost polybutadiene. Very often these internal double bonds have remained in the final product, or have been hydrogenated.

Ruthenium carbonyl has been found an excellent catalyst for dialkylaminomethylation of pendant vinyl groups in polybutadiene, for example. Ruthenium-rhodium catalysts have been used to increase reaction rates, but have often caused gelled polymers for many who have worked in this area.

It would be a considerable advance in the art to devise a system for selectively producing dialkylaminomethylated internal olefin polymers from CO, hydrogen, low cost polymeric olefins such as the 1,4-polybutadiene and secondary amines by an aminomethylation process which results in a product with a high percentage of dialkylaminomethylated polymers. The feasibility of using relatively inexpensive, 1,4-polybutadiene feedstock would represent as much as a 50% decrease in raw material cost for producing these dialkylaminomethylated polymers, but less expensive 1,4-polybutadienes have more internal double bonds.

It would be an advance in the art to devise a catalyst system which causes not only vinyl but internal olefin groups to react. The resulting high amine content polymers with higher functionality should have greater water solubility and be very useful as down hole corrosion inhibitors. In addition, it would be an advance over prior art to devise a process with good conversion of polymeric internal olefins and selectivity to the corresponding dialkylaminomethylated polymers.

SUMMARY OF THE INVENTION

These and other desirable results are achieved by the process of this invention comprising preparing dialkylaminomethylated polymers by reacting polymers containing internal olefin groups, a secondary amine, and synthesis gas (a mixture of carbon monoxide and hydrogen) in the presence of a catalyst system comprising a ruthenium-containing compound, rhodium-containing compound, a hindered phosphine and a solvent and heating the resulting mixture to a temperature of at least 100° C. and a pressure of at least 100 psi until there is substantial formation of the desired dialkylaminomethylated polymer.

DETAILED DESCRIPTION OF THE INVENTION

In the broadest aspect of this invention dialkylaminomethylated polymers are prepared from polymers containing internal olefin groups, synthesis gas (a mixture of carbon monoxide and hydrogen), and a secondary amine in the presence of a catalyst system comprising a ruthenium-containing compound and rhodium-containing compound with a hindered phosphine, and a solvent and heating the resultant mixture to a temperature of at least 100° C. and a pressure of at least 100 psi until there is substantial formation of the desired dialkylaminomethylated polymer product and separating said product.

The aminomethylation reaction used in this invention to prepare dialkylaminomethylated polymers from polymers containing internal olefins, synthesis gas (CO/H$_2$) and secondary amines can be represented by the following general equation (1):

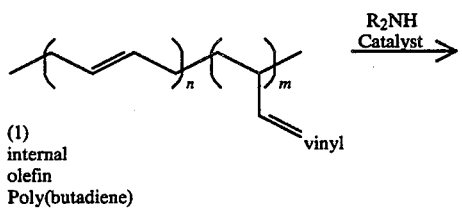

(1)
internal olefin
Poly(butadiene)

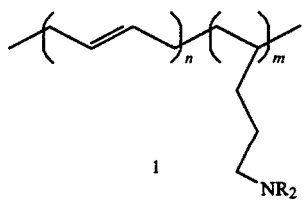

1

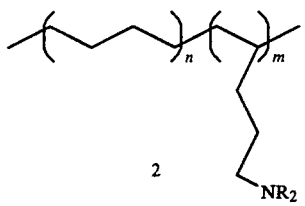

2

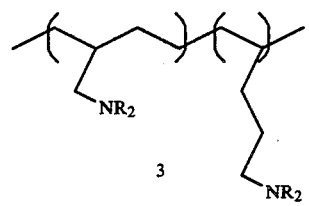

3

1 and 2 - Polymers of others
3 - Polymers of this invention

Here, n and m represent integers between 2 and 5,000 and R represents an alkyl group with between one and 20 carbon atoms.

Structure 3 represents the polymer of this invention wherein internal olefin bonds have been functionalized while at the same time avoiding polymer gelling. It has been found that careful selection of Ru/Rh/phosphine catalyst ratios, phosphine structure and specific reaction conditions can help to avoid polymer gelling.

In order to present the inventive concept in the greatest possible detail to promote its understanding, the following supplementary disclosure is submitted.

A. CATALYST COMPOSITION

The catalysts suitable in the practice of this invention all contain ruthenium, rhodium and a sterically hindered phosphine. The actual catalytically active species is unknown, but is believed to comprise ruthenium, rhodium and phosphine in complex combination with carbon monoxide and hydrogen.

The ruthenium catalyst precursors may take several different forms, the most suitable of which are carbonyls. For instance, the ruthenium may be added to the reaction mixture in an oxide form, as in the case, for example, ruthenium(IV) oxide, hydrate, anhydrous ruthenium(IV) dioxide and ruthenium(VIII) tetraoxide. Alternatively, it may be added as the salt of a suitable organic carboxylic acid, for example, ruthenium(III) acetate, ruthenium naphthenate, ruthenium valerate and as a ruthenium complex with carbonyl-containing ligands, such as ruthenium(III) acetylacetonate. The ruthenium may also be added to the reaction zone as a carbonyl or hydridocarbonyl derivative. Here, suitable examples include triruthenium dodecacarbonyl and other hydridocarbonyls such as H$_2$Ru$_4$(CO)$_{13}$ and H$_4$Ru$_4$(CO)$_{12}$, and substituted carbonyl species such as the tricarbonylruthenium(II) chloride dimer, [Ru(CO)$_3$Cl$_2$]$_2$.

Typical ruthenium carbonyl compounds include triruthenium dodecacarbonyl, ruthenium(III) acetylacetonate and ruthenium(IV) oxide hydrate.

Good results were observed with triruthenium dodecacarbonyl.

The rhodium-containing catalyst may take a variety of forms. For instance, the rhodium may be added to the reaction mixture as one or more oxides of rhodium, rhodium salts of a mineral acid, rhodium salts of an organic carboxylic acid and rhodium carbonyl or hydridocarbonyl derivatives.

Rhodium oxides include, among others, rhodium(III) oxide and rhodium(III) oxide, hydrate. Useful rhodium halides include rhodium(III) chloride, rhodium(III) bromide and rhodium(III) iodide. The rhodium-containing compound may be added as the salt of a mineral acid, as in the case of rhodium nitrate, or as the salt of a suitable organic carboxylic acid, for example, rhodium(II) acetate dimer, rhodium naphthenate, rhodium valerate, and rhodium complexes with carbonyl-containing ligands, such as rhodium(III) acetylacetonate. The rhodium may also be added to the reaction zone as a carbonyl or hydrocarbonyl derivative. Here suitable examples include tetrarhodium dodecacarbonyl, dicarbonylacetylacetonatorhodium(I), chlorodicarbonylrhodium(I) dimer, and hexarhodium hexadecacarbonyl, as well as phosphine derivatives thereof, such as hydrocarbonyltris(triphenylphosphine)rhodium(I), chlorocarbonylbis(triphenylphosphine)rhodium(I), and chlorotris(triphenylphosphine)rhodium(I).

The gist of this invention comprises the use of certain phosphine and arsine ligands, particularly hindered phosphines, to promote the reaction of the internal olefin bonds in polybutadiene.

Suitable classes of phosphine and arsine ligands for the practice of this invention include:

1. Sterically crowded trialkyl phosphines of minimum cone angle greater than 150° C. Examples of such phosphines include tri(cyclohexyl)phosphine, tri(tert.-butyl)phosphine and tri(iso-propyl)phosphine.

2. Moderately basic aryl, substituted aryl and mixed aryalkyl phosphines of $pK_a<6$. Example of such suitable phosphines include tri(ortho-tolyl)phosphine, tris-(ortho-methoxyphenyl)phosphine, tri(para-fluorophenyl)phosphine, triphenylphosphine, tri(para-chlorophenyl)phosphine and methyldiphenylphosphine.

3. Bidentate phosphines where the phosphorus atoms are separated by four or more carbons, such as, for example,
1,4-bis(diphenylphosphine)butane,
1,5-bis(diphenylphosphino)pentane and
1,6-bis(diphenylphosphino)hexane.

4. Certain monodentate and bidentate arylarsines, as, for example, triphenylarsine and 1,2-bis(diphenylarsino)ethane.

The preferred ligands in the practice of this invention are the sterically hindered aryl and alkylphosphines of cone angle >150° such as the tri(O-tolyl)phosphine, tris(O-methoxyphenyl)phosphine and tri(cyclohexyl)phosphine. These hindered phosphines may be represented by the following two general structural formulae:

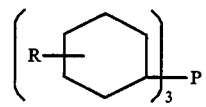

A

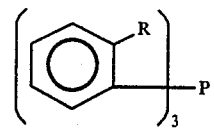

B where R equals an alkyl or alkoxy radical having 1 to 20 carbon atoms in a branched or linear chain, including, but not limited to, methyl, ethyl, n-butyl, iso-butyl, octyl, 2-ethylhexyl and dodecyl radicals, as well as the methoxy radicals and R in Structure A may be ortho, meta or para to each carbon-phosphorus bond and may also be hydrogen.

As will be demonstrated in the following examples, it appears that an aminomethylated polymer which remains liquid at ambient temperatures, and which is highly functionalized, may be generated with each of these classes of added ligands.

B. FEEDSTOCK

The feedstocks used in the practice of this invention comprises a polymer with internal olefin bonds, a secondary amine, carbon monoxide and hydrogen.

The process can be applied to any polymeric polyolefin, including monosubstituted, disubstituted and trisubstituted polymeric polyolefins containing 4 to 20 carbon atoms per monomer, as well as mixtures of the same. The process is particularly suited to the aminomethylation of polyolefins containing 4 to 8 carbon atoms per monomer unit and having molecular weights in the range of 1000 to 20,000 or more. Examples of suitable olefins include polyolefins such as polybutadiene, acrylonitrile-butadiene copolymer and polyisoprene.

Preferred in the practice of this invention is the use of polymers with a predominance of internal, rather than pendant vinyl olefin groups and particularly those polymers containing both the 1,2-polybutadiene and 1,4-polybutadiene units. Such polymers should have two to 5000 repeating units. Examples of such polymers include the hydroxyl terminated polymers of butadiene with an average M. W. of ca. 3000 and having an average degree of polymerization of ca. 50. These materials are sold by Arco Chemical Company under the tradename Poly bd ® Resins R-45M and R-45HT. They typically contain ca. 80% interinal olefin and 20% vinylic olefin groups per molecule.

Suitable nitrogen-containing coreactants useful in the practice of this invention include secondary amines containing alkyl groups with two to 20 carbon atoms. These amines may be straight or branched chain aliphatic series, they may be cycloaliphatic amines, or they may be aromatic amines. Secondary aliphatic amines which can be used satisfactorily include dimethylamine, diethylamine, methylethylamine, di(n-propyl)amine, di(iso-propyl)amine, di(ethylhexyl)amine, piperidine, morpholine, di(n-heptyl)amine, and di(n-decyl)amine, as well as 2-aminooctane, N-methylaniline and pyrrolidine. Very good results were obtained in the process of this invention using diethylamine.

The quantity of nitrogen-containing coreactant employed in the instant invention is not critical and may vary over a wide range. In general, however, it is desirable to conduct these syntheses in the presence of sufficient secondary amine so as to satisfy the stoichiometry of equation (1).

The relative amounts of carbon monoxide and hydrogen which can be initially present in the synthesis gas mixture are variable, and these amounts may be varied over a wide range. In general, the mole ratio of $CO:H_2$ is in the range from about 20:1 to about 1:20, and preferably from about 5:1 to 1:5, although ratios outside these ranges may also be employed with good results. Particularly in continuous operations, but also in batch experiments, the carbon monoxide-hydrogen gaseous mixtures may also be used in conjunction with up to 50% by volume of one or more other gases. These other gases may include one or more inert gases such as nitrogen, argon, neon, and the like, or they may include gases that may, or may not undergo reaction under carbon monoxide hydrogenation conditions, such as carbon dioxide, and hydrocarbons, such as methane, ethane, propane and the like.

C. SOLVENT

The synthesis of polymeric polyamines is optionally achieved in the presence of added solvents. These solvents may comprise a single-phase system, or a two-phase solvent media. For ease of product separation, catalyst separation and improved selectivity to desired polyamine, a two-phase solvent media may be preferred in many cases.

Where the aminomethylation reaction is conducted in a suitable mixture of two largely immiscible solvents (i.e. using a two-phase solvent system), one component need be a polar liquid and the other component, a non-polar liquid under the conditions of reaction.

Suitable polar solvent components for the practice of this invention may be selected from the group that includes certain carboxylic amides, and certain ethereal solvents.

These solvents should be liquids under the conditions of aminomethylation reaction (eq. 1) and should substantially solubilize the metal-catalyst component.

Suitable amide solvents may be selected from the group of amides that includes N,N-dimethylformamide, N,N-dimethylacetamide, hydroxy-ethylpyrrolidone, N-methylpyrrolidone, N-isopropylpyrrolidone, N,N-diethylformamide, N,N-dimethylacetamide, N,N-dimethylbenzamide, N,N-diphenylformamide, N,N-dimethylbutyramide and N-benzylpyrrolidone.

Examples of suitable ether solvents include p-dioxane, tetrahydrofuran, 2-methoxyethanol, diisopropylether, diphenyl ether, ethyleneglycol dimethyl ether, diethyleneglycol dimethyl ether and triethylene glycol dimethyl ether as well as mixtures thereof.

The second-phase of this two-component solvent mixture is a non-polar liquid selected from the group consisting of aliphatic and aromatic hydrocarbons. Suitable hydrocarbon solvents include octane, n-hexane, mixed hexanes, cyclohexane, petroleum ether fractions, n-decane, benzene, toluene, substituted aromatics as well as mixtures thereof.

A preferred class of two-phase solvent components for aminomethylation includes: N,N-dimethylformamide+mixed hexanes, N,N-dimethylformamide+petroleum ether, 2-methoxyethanol+mixed hexanes and N,N-dimethylformamide+cyclohexane.

The amount of solvent employed may vary as desired. In general, it is desirable to use sufficient solvent to fluidize the catalyst system.

D. CONCENTRATION

The quantity of a ruthenium compound, rhodium compound, hindered phosphine and solvent employed in the instant invention is not critical and may vary over a wide range. In general, the novel process is desirably conducted in the presence of a catalytically effective quantity of active ruthenium and rhodium species and of the solvent which gives the desired product in reasonable yield. The reaction proceeds when employing about $1 \times 10^{-6}$ weight percent, and even lesser amounts, of ruthenium carbonyl together with about $1 \times 10^{-6}$ weight percent or less of rhodium basis the total weight of the reaction mixture. The upper concentration is dictated by a variety of factors including catalyst cost, partial pressures of carbon monoxide and hydrogen, operating temperature, etc. A ruthenium concentration of from about $1 \times 10^{-5}$ to about 5 weight percent in conjunction with a rhodium concentration of from about $1 \times 10^{-5}$ to about 5 weight percent, based on the total weight of reaction mixture is generally desirable in the practice of this invention.

A concentration of hindered phosphine of from about $1 \times 10^{-5}$ to about 5 weight percent based on the total weight of the reaction mixture is desirable.

E. TEMPERATURE

The temperature range which can usefully be employed in the process of the invention may vary over a considerable range depending upon experimental facts, including choice of catalyst, pressure and other variables. The process can take place at from 100° C. to about 200° C. or more. The preferred temperatures are above 120° C. and more preferably between 120° C. and 180° C. Coming under special consideration are temperatures ranging from 150° C. to 180° C.

F. PRESSURE

Superatmospheric pressures of at least 100 psi or greater lead to substantial yields of the desired amines. A preferred range is from about 500 psi to about 8000 psi, although pressures above 8000 psi also provide useful yields of the desired products. Best results are obtained in the range from 1000 psi to about 4000 psi.

The pressures referred to herein represent the total pressure generated by all the reactants although they are substantially due to the carbon monoxide and hydrogen reactants.

G. BY-PRODUCTS

The desired products of the reaction, the dialkylaminomethylated polymers, are formed in significant quantities with up to 90% of the double bonds undergoing aminomethylation. Further, a large percentage of internal double bonds as well as vinylic double bonds undergo aminomethylation. The desired polymeric products cannot be recovered from the reaction mixture by conventional means such as fractional vacuum distillation, etc., because of their high molecular weights. Products are identified by proton nmr analysis, by total amine, and total nitrogen analyses.

In the process of this invention it has been discovered that the addition of a hindered phosphine to the reaction mixture of the aminomethylation reaction causes not only vinyl, but internal olefin groups to react and reduces polymer gelling which often occurs where ruthenium and rhodium catalysts have been used in aminomethylation to increase reaction rates. In the process of this invention more internal double bonds are functionalized with amine. The advantage of this is that when the aminomethylated polymers are converted to the acid salt form, the higher functionality imparts greater water solubility etc.

I. INTRODUCTION OF CATALYST

The process of the invention can be conducted in a batch, semi-continuous or continuous manner. The catalyst can be initially introduced into the reaction zone batchwise, or it may be continuously or intermittently introduced into such a zone during the course of the synthesis reaction. Operating conditions can be adjusted to optimize the formation of the desired dialkylaminomethylated internal olefins and said material can be recovered by phase separation. A fraction rich in the catalyst components may then be recycled to the reaction zone, if desired.

J. IDENTIFICATION TECHNIQUES

The products have been identified in this work by proton and carbon-13 nmr analysis and elemental analyses. All temperatures are in degrees centigrade and all pressures in pounds per square inch (psi).

Yields of dialkylaminomethylated polymer products have been estimated in accordance with equation (1), basis the quantity of polybutadiene converted, and expressed as molar ratios.

To illustrate the process of the invention, the following examples are given. Examples I through XXI illustrate the synthesis of dialkylaminomethylated polybutadiene. It is to be understood, however, that the examples are given in the way of illustration and are not to be regarded as limiting the invention in any way.

EXAMPLE I

A 100 ml 316 stainless steel high pressure autoclave was charged with 12.0 g Arco R45HT polybutadiene*, 20.0 g diethylamine, 60.0 g N,N-dimethylformamide, 48.0 g cyclohexane, 0.05 g $Ru_3(CO)_{12}$, 0.10 g $HRh(CO)(Ph_3P)_3$ and 0.50 g tris(o-methoxyphenyl)phosphine, then purged with 2:1 mole ratio $H_2/CO$. The autoclave was then pressured to 1000 psig with 2:1 $H_2/CO$ and heated to 160° C. Then pressure was increased to 4000 psig. These conditions were maintained for five hours, repressuring as necessary. The reactor was then cooled and the contents discharged.
*20% vinyl, 80% internal olefin, hydroxy terminated The upper phase was separated and evaporated at 40°–100° C. at 1 mm Hg to remove volatiles. Titration of the viscous liquid with acid and Kjeldahl analysis showed that the product contained 4.82 meq/g total amine and 6.23% nitrogen.

Proton nmr analysis with trifluoroacetic acid-$d_1$ showed the product contained diethylaminomethyl groups and internal double bonds in the respective mole ratio of 7.5:1.3.

EXAMPLE II

An experiment identical to that above was performed, with the following exceptions:
1. 0.10 g $Ru_3(CO)_{12}$ and 0.05 g $HRh(CO)(Ph_3P)_3$ were charged instead of the amounts in Example I.
2. The reaction was run for 6 hours instead of 5.

The product contained 3.19 meq/g total amine by titration and a mole ratio of internal olefin to amine of 6.0:6.8.

EXAMPLE III

An experiment identical to Example I was performed, with the following changes:
1. 0.20 g $HRh(CO)(Ph_3P)_3$ was added instead of 0.1 g.
2. 0.010 g each of p,p'-diphenylphenylenediamine and di-tert-butyl-p-cresol were added.
3. 1.00 g tris(o-methoxyphenyl)phosphine was added instead of 0.50 g.

Reaction conditions were 170° C. at 4000 psig for six hours. The product contained 5.9 meq/g total amine and 8.25% nitrogen. (Theoretically the product would contain 7.09 meq/g amine and 9.93% N if all double bonds were diethylaminomethylated). It is estimated that ca. 83% of the double bonds have been diethylaminomethylated. Proton nmr showed the product contained the following mole ratios:

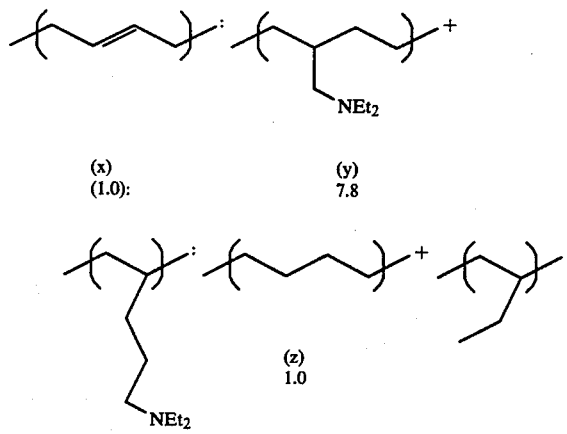

No diethylamine was detected in the sample by $^{13}C$ nmr.

EXAMPLE IV

The procedure in Example IV was identical to Example III above, except the phosphine ligand was omitted.

The product was nearly a gel.

Proton nmr analysis was obtained, however, and it showed the following mole ratios of functional groups indicating more double bond hydrogenation than in Example III.

x:y:z
0.5:7.7:3.2

Data in the following examples illustrate the synthesis of dialkylaminomethylated-1,4-poly(butadienes) starting from poly-1,4-butadiene having ca. 20% vinylic content, e.g. ARCO R45HT, diethylamine and synthesis gas.

EXAMPLE V

Example V demonstrates a typical synthesis of the diethylaminomethylated polybutadiene using the $Ru_3(CO)_{12}$—$HRh(CO)(PPh_3)_3$—(o—MePh)$_3$P* catalyst precursor. Here it is estimated that ca. 62% of the double bonds have been diethylaminomethylated, the proton nmr shows the product contains the olefinic, aminomethylated and hydrocarbon functions of the following types:

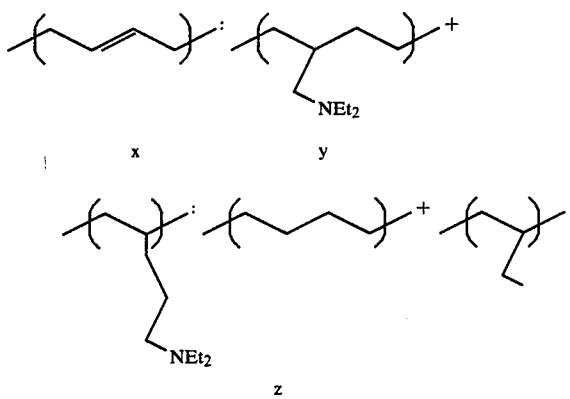

*(o—MePh)₃, Pk_a = 3.1; cone angle 194°, data taken from references in Table I.

An 850 ml stainless steel pressure reactor with glass liner was charged with 12.0 g ARCO R45HT polybutadiene (20% vinyl, 80% internal olefin, hydroxyterminated), 20.0 g diethylamine, 60.0 g dimethylformamide, 48.0 g cyclohexane, 0.05 g triruthenium dodecacarbonyl, 0.10 g of tris(triphenylphosphine)(carbonyl)rhodium(I) hydride, and 0.50 g of tris(o-methylphenyl)phosphine, then purged with a 2:1 mix of synthesis gas ($H_2$/CO). The reactor was pressured to 1000 psig with 2:1 $H_2$/CO and heated with agitation to 160° C. Pressure was then increased to 4000 psig using $H_2$/CO (2:1) from a large surge tank. These conditions were maintained for five hours, repressuring as necessary. The reactor was then cooled and the contents discharged. Total liquid recovery was 142.5 g.

The upper phase (80 ml) was separated and evaporated at 40°-110° C. at 1 mm Hg to remove volatiles. Titration of the viscous liquid residual product (19.3 g) showed it to contain:

6.07% nitrogen
4.49 meq/g total amine

Proton nmr analysis showed the product liquid to contain diethylaminomethyl groups and internal double bonds in the respective mole ratio of:

x:y:z = 4.5:6.7:3.2

EXAMPLES VI-XXI

In Examples VI-XXIII the procedure was the same as that described in Example I. The same ruthenium and rhodium catalysts were used, but in combination with a variety of monodentate and bidentate phosphines and arsines. Basis these data, it appears that aminomethylated polymer which remains liquid at ambient temperatures and which is highly functionalized, is best generated with the following classes of added ligands:

a. Moderately basic aryl, substituted aryl and mixed arylalkyl phosphines of pKa <6, e.g.: (o—MePh)₃P; (o—MeOPh)₃P; (p—FPh)₃; Ph₃P; MePh₂P
b. Sterically crowded alkyl phosphines of (minimum) cone angle greater than 150°, e.g.: ($C_6H_{11}$)₃P
c. Certain monodentate and bidentate arylarsines, e.g.: Ph₃As; Ph₂As($CH_2$)₂AsPh₂
d. Bidentate phosphines where the phosphorus atoms are separated by four or more carbons, e.g.: Ph₂P($CH_2$)₄PPh₂; Ph₂P($CH_2$)₅PPh₂

Gelled products that could not be adequately analyzed and characterized were obtained with the following classes of ligands:

a. Strongly basic trialkyl and alkylaryl phosphines of Pk_a > 6 and cone angle less than 150°, e.g. Bu₃P and Me₂PhP.
b. Bidentate phosphines where the phosphorus atoms are separated by three or less carbons, e.g.: Ph₂P($CH_2$)₂PPh₂ and Ph₂P($CH_2$)₃PPh₂.

TABLE I

| | | | Diethylaminomethylation of Poly(butadiene) | | | | | |
| | Phosphine/ | | Cone | Product | N | Amine | Molar Ratio[d] | | |
| Run | Arsine | pKa[b] | Angle °C.[c] | (g) | wt % | meq/g | y | x | z |
|---|---|---|---|---|---|---|---|---|---|
| VI | (o-MeOPh)₃P | | | 15.8 | 5.32 | 4.32 | 10 | 10.3 | 1.7 |
| VII | (p-ClPh)₃P | 1.03 | 145 | 19.6 | 7.12 | 5.40 | 10 | 4.5 | 1.3 |
| VIII | (p-FPh)₃P | 2.0 | 145 | 19.9 | 6.23 | 5.56 | 10 | 3.2 | 1.9 |
| IX | Ph₃P | 2.7 | 145 | 22.5 | 7.25 | 5.47 | 10 | 3.4 | 1.0 |
| X | (p-MePh)₃P | 4.0 | 145 | 23.0 | 6.94 | 5.60 | 10 | 2.6 | 1.9 |
| XI | MePh₂P | | 136 | 21.8 | 5.89 | 4.36 | 10 | 1.4 | 4.7 |
| XII | Me₂PhP | 6.3 | 122 | 16.43 | — | — | | | |
| XIII | Bu₃P | 8.4 | 130 | 16.9[e] | — | — | | | |
| XIV | ($C_6H_{11}$)₃P | 9.7 | 179 | 23.9 | 6.42 | 5.54 | 10 | 1.7 | 2.3 |
| XV | Ph₃As | | 145 | | 5.99 | 4.49 | 10 | 4.5 | 6.1 |
| XVI | Ph₂As($CH_2$)₂AsPh₂ | | | 16.2 | 4.82 | 3.67 | 10 | 22.9 | — |
| XVII | Ph₂P($CH_2$)₂PPh₂ | | 125 | —[f] | — | — | | | |
| XVIII | Ph₂P($CH_2$)₃PPh₂ | | 127 | 12.3[e] | — | — | | | |
| XIX | Ph₂P($CH_2$)₄PPh₂ | | | 19.6 | 7.22 | 5.22 | 10 | 2.5 | 0.7 |
| XX | Ph₂P($CH_2$)₅PPh₂ | | | 22.8 | 6.37 | 5.26 | 10 | 2.1 | 0.5 |
| XXI | Et₂P($CH_2$)₂PEt₂ | | | 13.2 | 2.73 | 2.02 | 10 | 60 | 1.8 |

[a]Run Conditions as in Example I
[b]Data taken from: J. Halpern, et al., J. Am. Chem. Soc. 94, 1881 (1972), R. P. Stewart, et al., Inorg. Chem., 7 1942 (1968): T. Allman and R. G. Goel, Can. J. Chem., 60, 716 (1982).
[c]C. A. Tolman, J. Am. Chem. Soc., 92, 2953 (1970); ibid, Chem. Rev., 77, 315 (1977)
[d]Designation x, y, z as in text.
[e]Product gelled, could not be analyzed.
[f]Single phase product It is noted that particularly preferred phosphine ligands are the sterically crowded aryl and alkylphosphines of cone angle >150° such as the tri-o-tolylphosphine, tri-o-methoxyphenylphosphine and tricyclohexylphosphine.

What is claimed is:

1. A process for selectively preparing dialkylaminomethylated polymers which comprises reacting a polymer with internal olefin groups, a secondary amine and synthesis gas (CO+$H_2$) in the presence of a catalyst system comprising a ruthenium-containing compound, a rhodium-containing compound, a sterically hindered phosphine from the group consisting of ligands represented by the formulae:

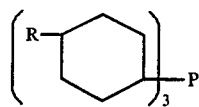

and

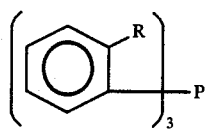

wherein R equals an alkyl or alkoxy radical having 1 to 20 carbon atoms in a branched or linear chain, and a solvent, heating the resultant mixture to a temperature of at least 100° C. and a pressure of at least 500 psi until there is substantial formation of the desired dialkylaminomethylated internal olefin polymers and separating the resulting product.

2. The process of claim 1 wherein the polymers with internal olefins have repeating units containing 4 to 20 carbon atoms.

3. The process of claim 1 wherein the polymeric poly-olefin is selected from the group consisting of polybutadiene, butadiene styrene copolymer and acrylonitrile-butadiene polymer.

4. The process of claim 1 wherein the polymeric olefin is a polybutadiene from the group consisting of both the 1,2-polybutadiene and 1,4-polybutadiene units with 2–5000 repeating units.

5. The process of claim 1 wherein the secondary amine is a nonhindered secondary amine, containing alkyl groups with two to 20 carbon atoms.

6. The process of claim 5 wherein the secondary amine is a dialkylamine.

7. The process of claim 5 wherein the secondary amine is selected from the group consisting of pyrrolidine, diethylamine, dimethylamine, morpholine and di-n-propylamine.

8. The process of claim 1 wherein the process is conducted with a ratio of CO to $H_2$ of about 1:5 to 5:1.

9. The process of claim 1 wherein the ruthenium-containing compound is selected from the group consisting of ruthenium complexes with carbonyl-containing ligands, ruthenium carbonyls and hydridocarbonyls, ruthenium oxides and substituted species thereof.

10. The process of claim 9 wherein the ruthenium-containing compound is selected from the group consisting of triruthenium dodecacarbonyl, ruthenium(III) acetylacetonate and ruthenium(IV) oxide hydrate.

11. The process of claim 1 wherein the rhodium-containing compound is selected from the group consisting of rhodium salts, rhodium oxides, rhodium carbonyls and substituted species thereof.

12. The process of claim 11 wherein the rhodium-containing compound is selected from the group consisting of tetrarhodium dodecacarbonyl, hexarhodium hexadecacarbonyl and hydridocarbonyltris-(triphenylphosphine)rhodium.

13. The process of claim 1 wherein the sterically hindered phosphine is selected from the group consisting of sterically hindered aryl and alkyl phosphines of cone angle $>150°$.

14. The process of claim 1 wherein the hindered phosphine is selected from the group including tri(o-tolyl)phosphine, tris(o-methoxyphenyl)phosphine and tri(cyclohexyl)phosphine.

15. The process of claim 1 wherein the solvent is a two-phase solvent media consisting of a non-polar solvent composition and a polar solvent compound.

16. The process of claim 15 wherein the non-polar solvent component is selected from the group consisting of aliphatic and aromatic hydrocarbons.

17. The process of claim 15 wherein the polar solvent component is selected from the group consisting of carboxylic amides.

18. The process of claim 16 wherein the aliphatic and aromatic hydrocarbons are selected from the group consisting of cyclohexane, n-hexane, mixed hexanes, benzene, toluene and substituted aromatics.

19. The process of claim 17 wherein the carboxylic amide is selected from the group consisting of N,N-dimethylformamide and N,N-dimethylacetamide.

20. The process of claim 1 wherein the temperature range is from 100° to 200° C.

21. The process of claim 20 wherein the temperature range is from 120° C. to 180° C.

22. The process of claim 1 wherein the pressure is from 500 psi to 8000 psi.

23. The process of claim 22 wherein the pressure is from 1000 psi to 4000 psi.

* * * * *